United States Patent
Ono

(10) Patent No.: US 7,046,609 B2
(45) Date of Patent: May 16, 2006

(54) FOCUS SEARCH METHOD AND REPRODUCING APPARATUS

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 389 days.

(21) Appl. No.: 10/406,443

(22) Filed: Apr. 4, 2003

(65) Prior Publication Data

US 2003/0214709 A1 Nov. 20, 2003

(30) Foreign Application Priority Data

Apr. 17, 2002 (JP) .......................... P 2002-114317

(51) Int. Cl.
*G11B 7/09* (2006.01)

(52) U.S. Cl. .............................. 369/53.28; 369/44.27; 369/44.29; 369/94

(58) Field of Classification Search ............. 369/44.25, 369/44.27, 44.29, 53.28, 94
See application file for complete search history.

(56) References Cited

U.S. PATENT DOCUMENTS

| | | | | |
|---|---|---|---|---|
| 4,744,069 A | * | 5/1988 | Sugiyama et al. | 369/44.29 |
| 5,719,834 A | * | 2/1998 | Futagawa et al. | 369/44.14 |
| 5,875,162 A | * | 2/1999 | Baba | 369/44.35 |
| 2002/0031061 A1 | * | 3/2002 | Yonezawa et al. | 369/44.32 |
| 2002/0048236 A1 | * | 4/2002 | Tada et al. | 369/44.27 |

FOREIGN PATENT DOCUMENTS

| | | | |
|---|---|---|---|
| JP | 10198993 A | * | 7/1998 |
| JP | 10-241169 | | 9/1998 |
| JP | 2001-134958 | | 5/2001 |

* cited by examiner

*Primary Examiner*—William Klimowicz
*Assistant Examiner*—Nathan Danielsen
(74) *Attorney, Agent, or Firm*—Morgan, Lewis & Bockius LLP

(57) ABSTRACT

A pickup is moved in a direction opposite to a pickup moving direction in which the pickup is to be moved. At a timing at which a period of time corresponding to one period of oscillation generated on an objective lens of the pickup has passed after moving the pickup in the direction opposite to the pickup moving direction, the pickup is moved in the pickup moving direction.

5 Claims, 8 Drawing Sheets

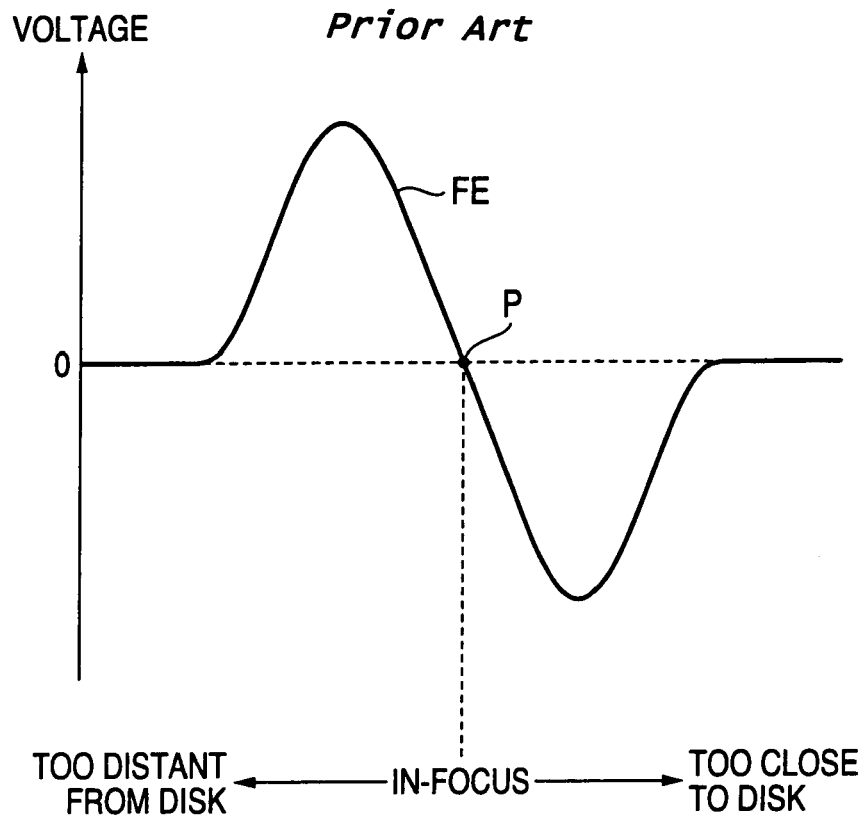
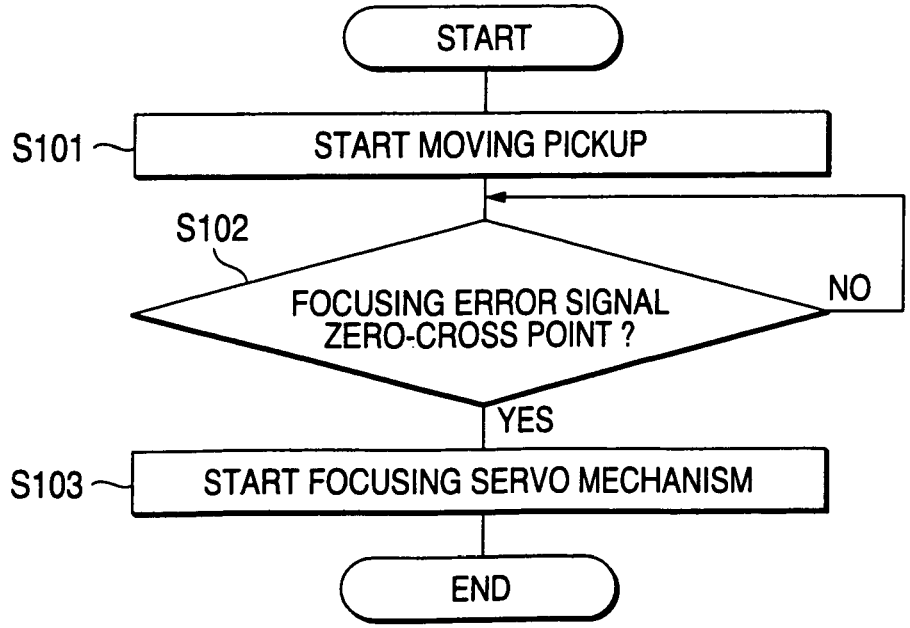

FOCUS SEARCH METHOD AND REPRODUCING APPARATUS

The present disclosure relates to the subject matter contained in Japanese Patent Application No. 2002-114317 filed Apr. 17, 2002, which is incorporated herein by reference in its entirety.

BACKGROUND OF THE INVENTION

1. Field of the Invention

The present invention relates to a focus search method for finding a position of an objective lens disposed on a pickup that is a unit for irradiating light to a recording medium, by moving the pickup, wherein the objective lens converges light irradiated on the recording medium at the position so that a focus of light irradiated on the recording medium can be adjusted on a recording face of the recording medium.

2. Description of the Related Art

In a disk reproducing apparatus for reading a signal recorded on a disk, which is a disk-shaped recording medium, when light is irradiated on the disk and the light reflected on the disk is converted into an electric signal, a focusing servo mechanism is provided in which a position of an objective lens (position of an objective lens with respect to a recording face of the disk), which converges light irradiated on the disk, in the optical axis direction is controlled so that a focus of light irradiated on the disk can follow the recording face of the disk.

In this case, focusing error signal FE, which shows a quantity of deviation from the focus of light irradiated on the disk to the recording face of the disk, changes as shown in FIG. 7 according to the position of the objective lens with respect to the recording face of the disk. When the objective lens is located at a position where the focus of light irradiated on the disk is adjusted on the recording face of the disk (This position will be referred to as an "in-focus-position" hereinafter.), focusing error signal FE is 0. When the objective lens is located in the vicinity of the in-focus-position, the more distant the objective lens is located from the disk, the more an absolute value of focusing error signal FE increases at the positive polarity. On the other hand, the closer the objective lens is located to the disk, the more an absolute value of focusing error signal FE increases at the negative polarity. However, when the objective lens is not located in the vicinity of the in-focus-position, the more distant the objective lens is located with respect to the disk, the more the absolute value decreases. Alternatively, the closer the objective lens is located with respect to the disk, the more the absolute value decreases.

In this case, the focusing servo mechanism controls a position of the objective lens with respect to the recording face of the disk so that focusing error signal FE becomes 0. Accordingly, in order to make the focusing servo mechanism function so that the focus of light irradiated on the disk can follow the recording face of the disk, it is necessary to activate the focusing servo mechanism in the vicinity of the in-focus-position.

Therefore, it is common to adopt the following method of activating the focusing servo mechanism. Operation for finding the in-focus-position, which will be referred to as "focus search" hereinafter, is conducted, and at the point of time when the in-focus-position is detected by this focus search (at point P in the case shown in FIG. 7), the focusing servo mechanism is activated.

The most fundamental operation conducted in the case of activating the focusing servo mechanism is shown in the flow chart of FIG. 8. First, when the entire pickup, which is a unit to irradiate light to the recording face of the disk, is moved in the direction perpendicular to the recording face of the disk, the objective lens provided in the pickup is made to come near or move away with respect to the recording face of the disk (S101). When focusing error signal FE comes to the zero-cross point (Yes at S102), it is judged that the objective lens coincides with the in-focus-position, and the focusing servo mechanism is activated (S103).

In this case, since the objective lens is supported in the optical axis direction by an elastic member such as a spring provided in the pickup, when the pickup is moved in a direction perpendicular to the recording face of the disk, damped oscillation of the natural frequency is generated on the objective lens. Therefore, for example, when the objective lens is made to come near the recording face of the disk by moving the pickup in a state in which the objective lens is completely stopped in the optical axis direction, a position of the objective lens with respect to the recording face of the disk changes as shown in FIG. 9. In other words, it is impossible to make the objective lens come near the recording face of the disk at a constant speed.

In the conventional focus search method, the pickup is moved without giving consideration to the above fact. Therefore, even when an operator intends to make the objective lens come near the recording face of the disk (even when an operator intends to make the objective lens move away from the recording face of the disk), the objective lens is actually moved away from the recording face (the objective lens is actually made to come near the recording face), by oscillation generated on the objective lens when the pickup is moved in the above way and deflection of recording face which are accumulated.

When the above phenomenon is caused, for example, in the case of focus search in which the pickup is moved so that the objective lens is made to come near the recording face of the disk, a wave-form of focusing error signal FE is formed into a shape shown in FIG. 10 in some cases. In FIG. 10, the objective lens comes near the recording face of the disk until it comes to point A, however, the objective lens is moved away from the recording face of the disk after it passes through point A. When the objective lens is moved too far away from the recording face of the disk, focusing error signal FE becomes 0 at point P'. Therefore, the in-focus-position is erroneously detected.

In this connection, according to the technique disclosed in JP-A-10-241169, in case where the tracking servo mechanism is activated after the pickup is moved in the radial direction of the disk, the tracking servo mechanism is not activated after the natural resonance oscillation caused in the movable section of the pickup is stabilized but the tracking servo mechanism is activated immediately before the rate of natural resonance oscillation becomes 0, so that the search time can be reduced. Therefore, the above problems cannot be solved by this technique.

According to the technique disclosed in JP-A-2001-134958, skipping of the track and deviating from the focus can be prevented by absorbing components included in the tracking error signal and the focusing error signal caused according to the rotary oscillation of the disk. Therefore, the above problems cannot be solved by this technique.

SUMMARY OF THE INVENTION

It is an object of the present invention to provide a focus search method capable of accurately detecting an in-focusposition of an objective lens in the case of detecting the in-focus-position of the objective lens by moving a pickup.

In order to accomplish the above object, according to an aspect of the present invention, there is provided a focus search method for searching a position of an objective lens disposed on a pickup which is a unit for irradiating light onto a recording medium, a focus of the light irradiated on the recording medium is adjusted on a recording face of the recording medium when the objective lens for converging the light to be irradiated on the recording medium is located at the position by moving the pickup, the focus search method comprising: generating oscillation on the objective lens; and moving the pickup at a timing such that the oscillation previously generated on the objective lens is canceled by moving the pickup.

For example, oscillation may be previously generated on the objective lens by moving the pickup in a direction opposite to a pickup moving direction in which the pickup is to be moved.

In this case, the movement of the pickup in the pickup moving direction is started at a timing at which a period of time corresponding to an integer multiple of one period of the oscillation generated on the objective lens has passed after moving the pickup in the direction opposite to the pickup moving direction. When the pickup is moved in the pickup moving direction, oscillation generated on the objective lens and oscillation previously generated on the objective lens can be canceled to each other.

BRIEF DESCRIPTION OF THE DRAWINGS

FIG. 7 is a diagram showing an example of the characteristic of a focusing error signal;

FIG. 8 is a flow chart showing a conventional motion conducted in the case of activating a focusing servo mechanism;

DETAILED DESCRIPTION OF THE PREFFERED EMBODIMENTS

Figure 1:
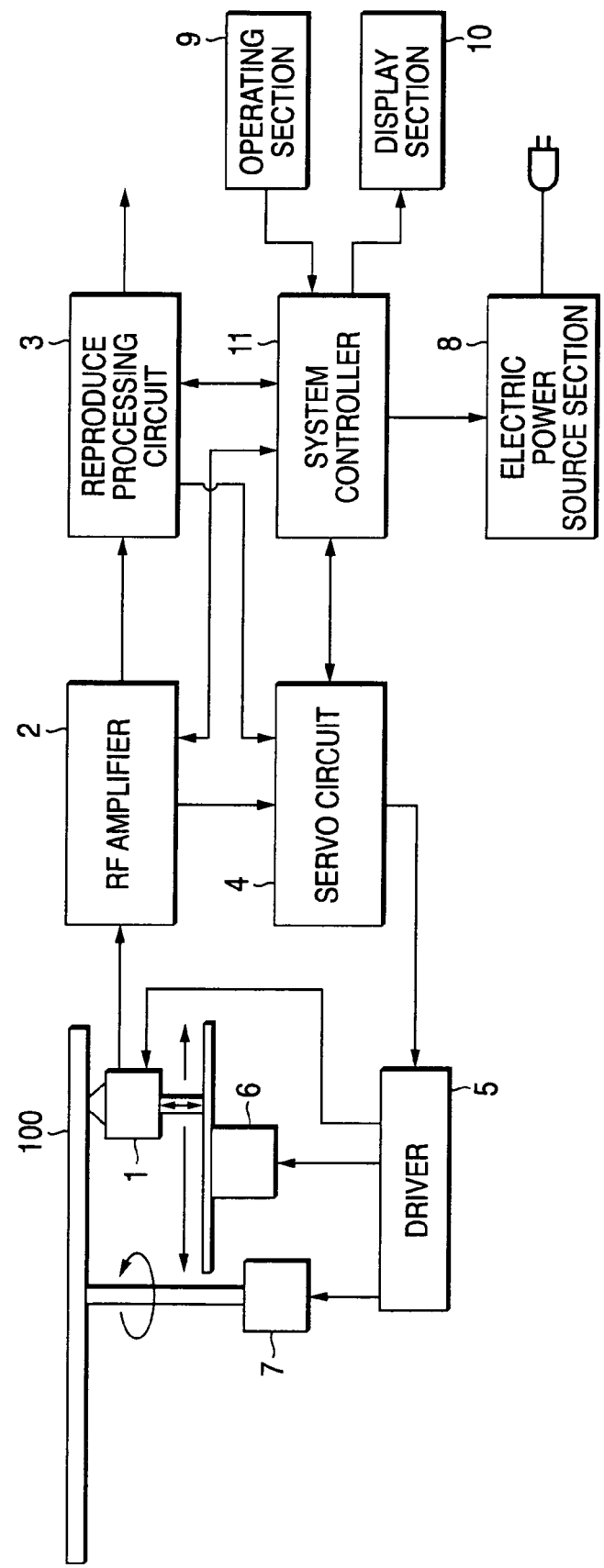
FIG. 1 is a block diagram of a disk reproducing apparatus of an embodiment of the present invention.

Referring to the drawings, an embodiment of the present invention will be described below. FIG. 1 is a block diagram of a disk reproducing apparatus. A pickup 1 optically reads out a signal recorded on a disk 100 when light is irradiated onto a recording face of the disk 100 and the light reflected on the disk 100 is converted into an electric signal.

The pickup 1 includes: an objective lens for converging light to be irradiated onto the disk 100; a focusing actuator for moving the objective lens in the optical axis direction (direction perpendicular to the recording face of the disk 100); and a tracking actuator for moving the objective lens in the radial direction of the disk 100.

An RF amplifier 2 amplifies a signal, which has been read out by the pickup 1, and gives the amplified signal to a reproduce processing circuit 3. The RF amplifier 2 generates a focusing error signal and tracking error signal and gives them to a servo circuit 4. The reproduce processing circuit 3 conducts demodulation processing, error detection and correction processing on the signal given by the RF amplifier 2, so that information can be reproduced. The reproduce processing circuit 3 generates a signal showing a rotary speed of the disk 100 from the signal given by the RF amplifier 2. The thus generated signal is given to the servo amplifier 4.

According to the focusing error signal and the tracking error signal given by the RF amplifier 2, the servo circuit 4 generates a focusing actuator drive signal, a tracking actuator drive signal and a feed motor drive signal and gives these signals to a driver 5. The servo circuit 4 generates a drive signal for driving a spindle motor to rotate the disk 100 at a target value according to the signal showing the rotary speed of the disk 100 given by the reproduce processing circuit 3. The thus generated drive signal is given to the driver 5.

According to the focusing actuator drive signal, the tracking actuator drive signal, the feed motor drive signal and the spindle motor drive signal given by the servo circuit 4, the driver 5 drives the focusing actuator and the tracking actuator that are provided in the pickup 1, a feed motor 6 and a spindle motor 7.

The feed motor 6 is a motor for moving the pickup 1 in the radial direction of the disk 100 and in the direction perpendicular to the recording face of the disk 100. The spindle motor 7 is a motor for rotating the disk 100. An electric power source section 8 generates an appropriate DC voltage from the commercial AC electric power source and supplies the thus generated DC voltage to each section via the wiring not shown.

An operating section 9 is used for a user to input various commands to the disk reproducing apparatus. A command which has been input to the disk reproducing apparatus by the user is given to a system controller 11. A display section 10 displays time, information showing a state of operation of the reproducing apparatus and information relating to data which is being reproduced (for example, the title of music which is being played back) The system controller 11 is composed of, for example, a microcomputer. The system controller 11 controls components of the disk reproducing apparatus according to the command input into the disk reproducing apparatus by the user.

Figure 2:
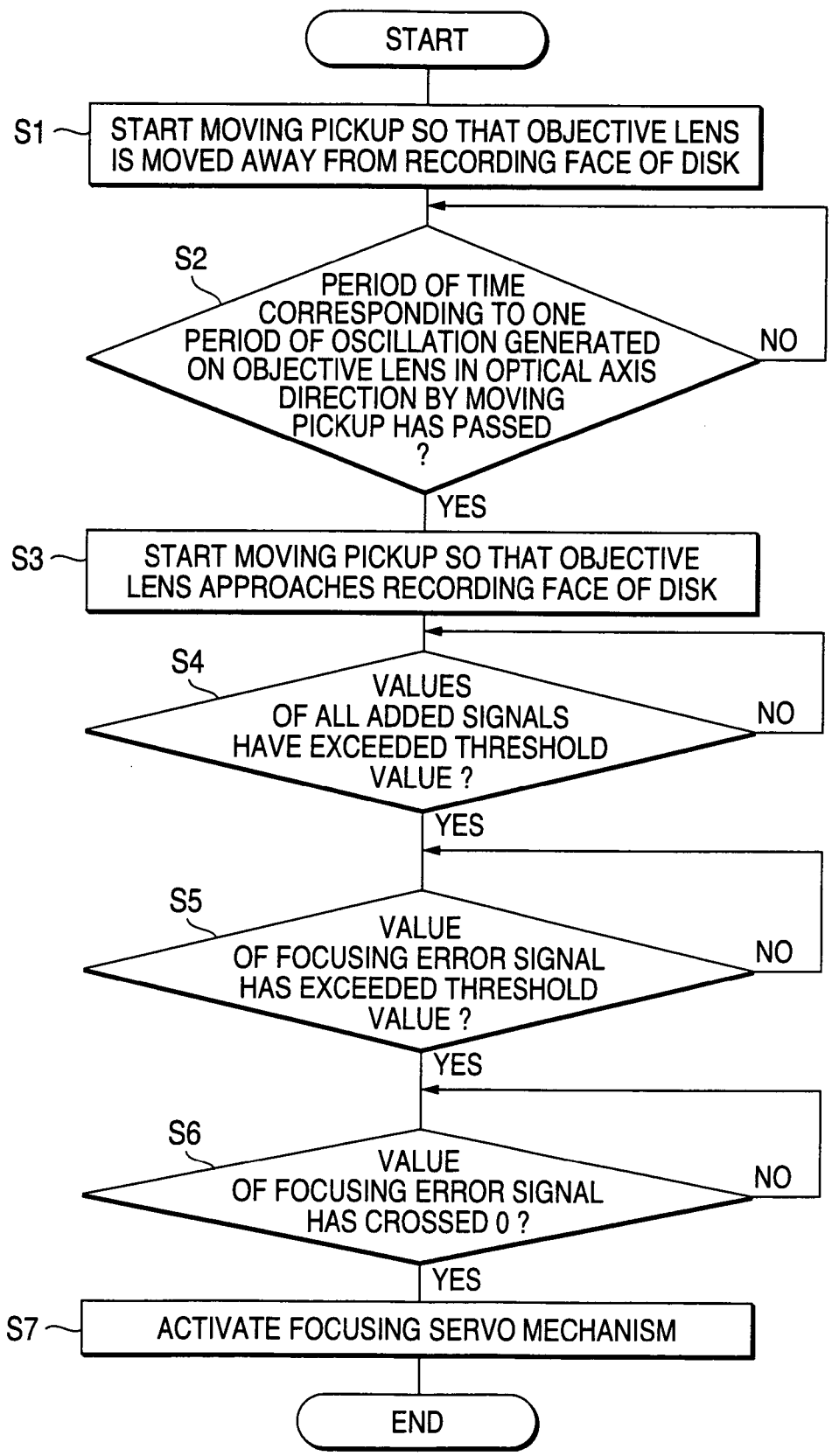
FIG. 2 is a flow chart of focus search operation conducted in the disk reproducing apparatus shown in FIG. 1.

Referring to the flow chart shown in FIG. 2, a focus search method of the disk reproducing apparatus of this embodiment will be described below. First, the movement of the pickup 1 is started so that the objective lens provided in the pickup 1 can be moved away from the recording face of the disk 100 (S1). Next, it is judged whether or not a period of time corresponding to one period T of oscillation, which is generated on the objective lens in the optical axis direction by moving the pickup 1, passes after the movement of the pickup 1 is started in S1 (S2), and the pickup 1 is started to move so that the objective lens approaches the recording face of the disk 100. In other words, the moving direction of the pickup 1 is inverted (S3).

Next, it is judged whether or not a value of the fully added signal, which is a signal read out by the pickup 1 from the disk 100, exceeds the threshold value (S4). When this value of the fully added signal exceeds the threshold value (Yes at S4), it is judged whether or not a value of the focusing error signal exceeds the threshold value (S5). When the value of the focusing error signal exceeds the threshold value (Yes at S5), it is judged whether or not a value of the focusing error signal crosses 0 (S6). When the value of the focusing error signal crosses 0 (Yes at S6), it is judged that the objective lens has been set at the in-focus-position, and the focusing servo mechanism is activated (S7).

Figure 3:
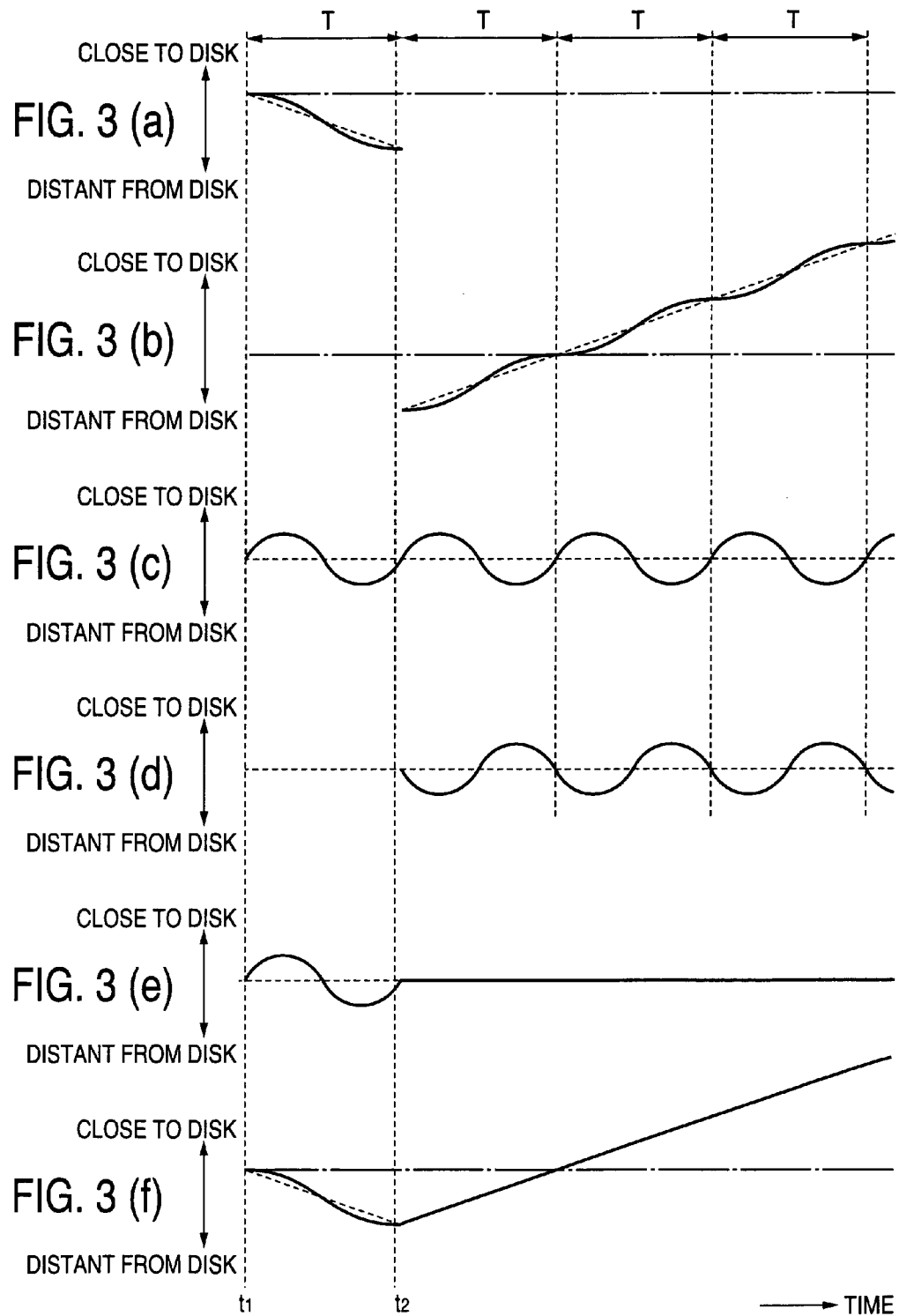
FIGS. 3(a) to 3(f) are diagrams for explaining a movement of an objective lens in focus search operation shown in FIG. 2.

In this case, since the objective lens is supported in the optical axis direction by an elastic member such as a spring in the pickup 1, a position of the objective lens with respect to the recording face of the disk 100 changes in S1 as shown by the solid line in FIG. 3(a). That is, as shown by the solid line in the enlarged view of FIG. 3(c), an oscillation component of period T is generated on the objective lens in the optical axis direction. This oscillation is actually a damped oscillation.

A position of the objective lens with respect to the recording face of the disk 100 is changed in S3 as shown by the solid line illustrated in FIG. 3(b). That is, as shown by the solid line in the enlarged view of FIG. 3(d), an oscillation component of period T is generated on the objective lens in the optical axis direction. This oscillation is actually a damped oscillation.

In S2, a period of time corresponding to one period T of oscillation generated on the pickup 1 is provided from time $t_1$ at which the movement of the pickup 1 is started in S1 to time $t_2$ at which the moving direction of the pickup 1 is inverted in S3. A phase of oscillation shown in FIG. 3(c) generated on the objective lens in S1 and a phase of oscillation shown in FIG. 3(d) generated on the objective lens in S3 are shifted from each other by 180°. Therefore, these two oscillations are canceled to each other.

Accordingly, as shown by the solid line in FIG. 3(e), after time $t_2$, the actual oscillation component of the objective lens is substantially 0. As a result, a position of the objective lens with respect to the disk 100 changes as shown by the solid line in FIG. 3(f). That is, the objective lens approaches the recording face of the disk 100 at a substantially constant speed.

Due to the foregoing, as long as an extremely large deflection does not exist on the recording face of the disk 100, there is no possibility of the occurrence of a case in which the objective lens is moved away from the recording face of the disk 100 although the pickup 1 is moved to make the objective lens come close to the recording face of the disk 100. Therefore, the in-focus-position can be accurately detected in S4 to S7.

In this connection, one of S4 and S5 or both of S4 and S5 may be omitted. However, when the processing of S4 and the processing of S5 are provided, it is possible to reduce the occurrence of a problem in which the in-focus-position is erroneously detected by the influence of noise.

Figure 4:
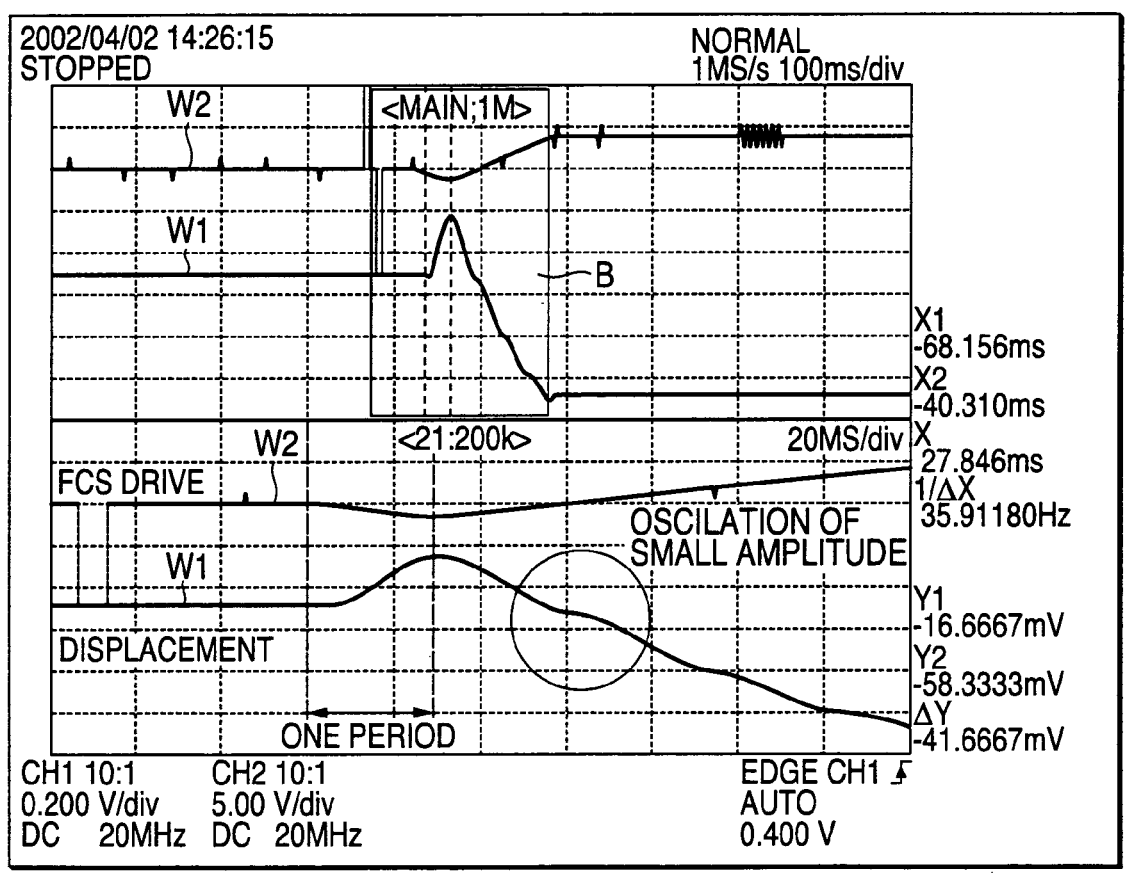
FIG. 4 is a diagram showing a result of measurement of a displacement of an objective lens in the case where a period of time of lowering a pickup before focus search operation is conducted by raising the pickup is made to be a period of time corresponding to one period of oscillation generated on the objective lens in the optical axis direction by moving the pickup.
Figure 5:
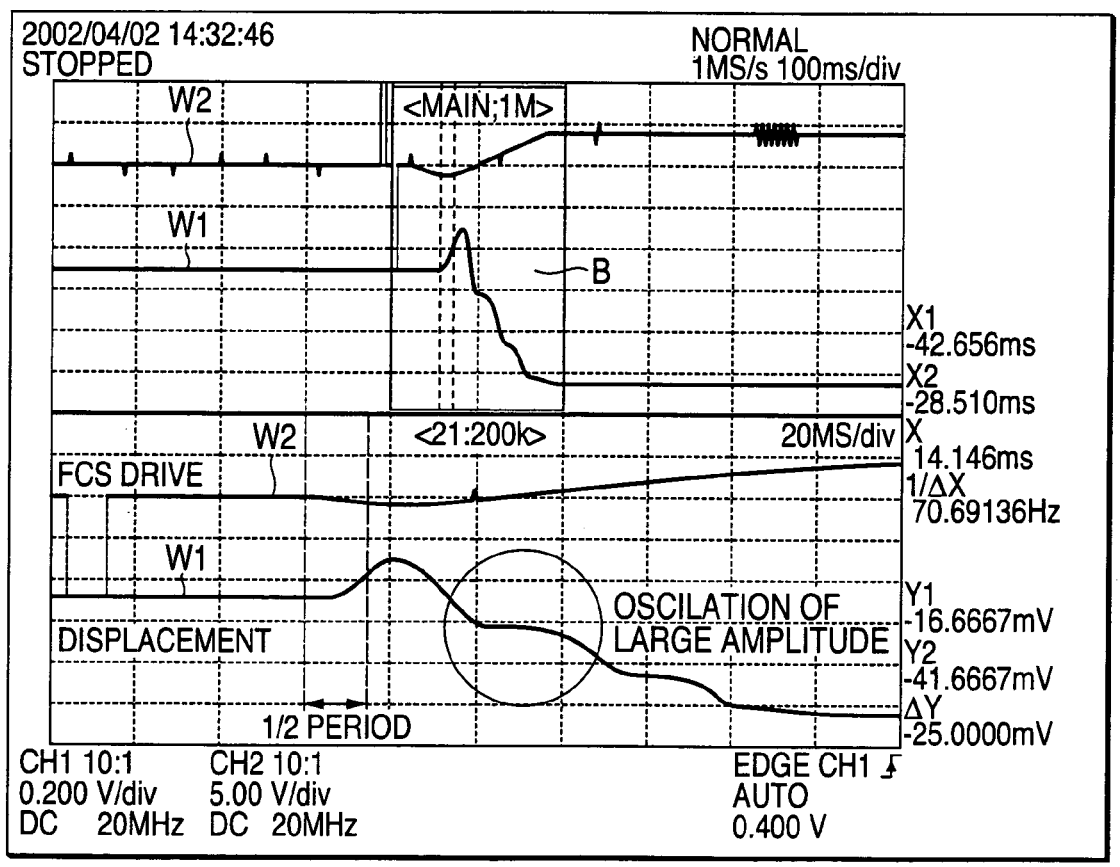
FIG. 5 is a diagram showing a result of measurement of a displacement of an objective lens in the case where a period of time of lowering a pickup before focus search operation is conducted by raising the pickup is made to be a period of time corresponding to a half of one period of oscillation generated on the objective lens in the optical axis direction by moving the pickup.
Figure 6:
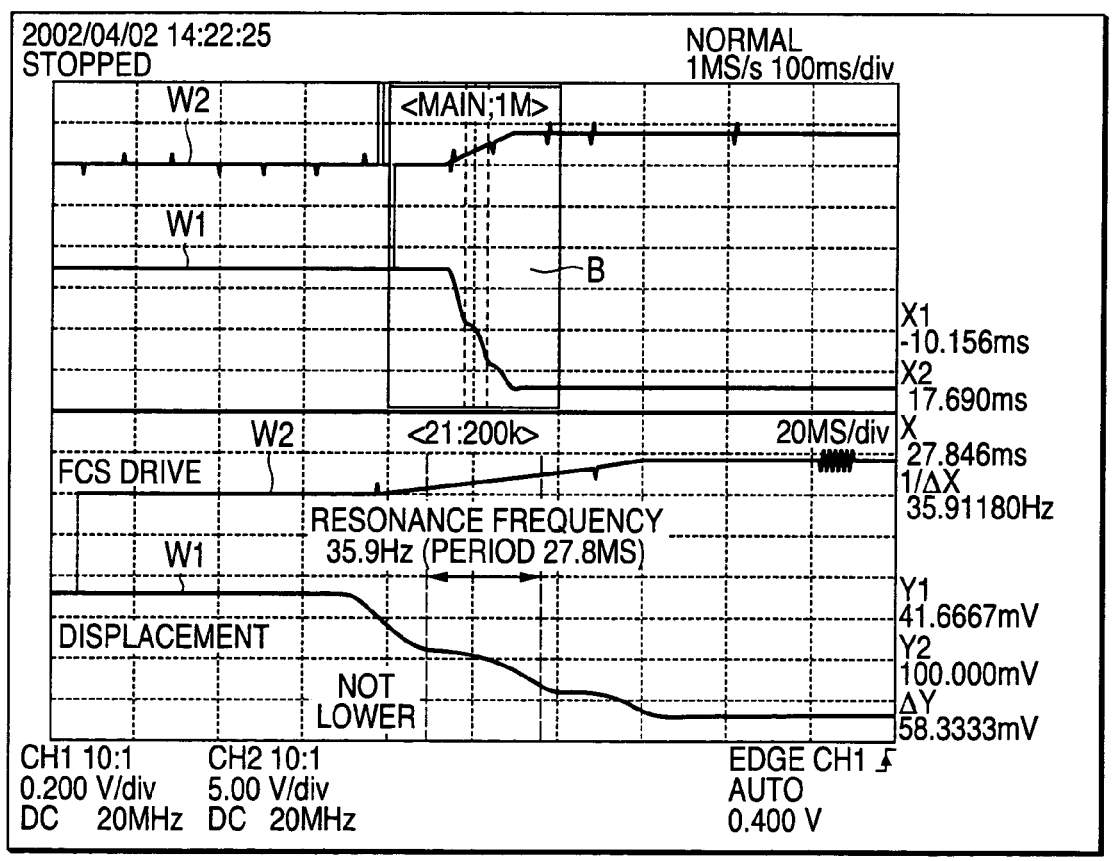
FIG. 6 is a diagram showing a result of measurement of displacement of an objective lens in the case where a pickup is not lowered before focus searching operation is conducted by raising the pickup.
Figure 9:
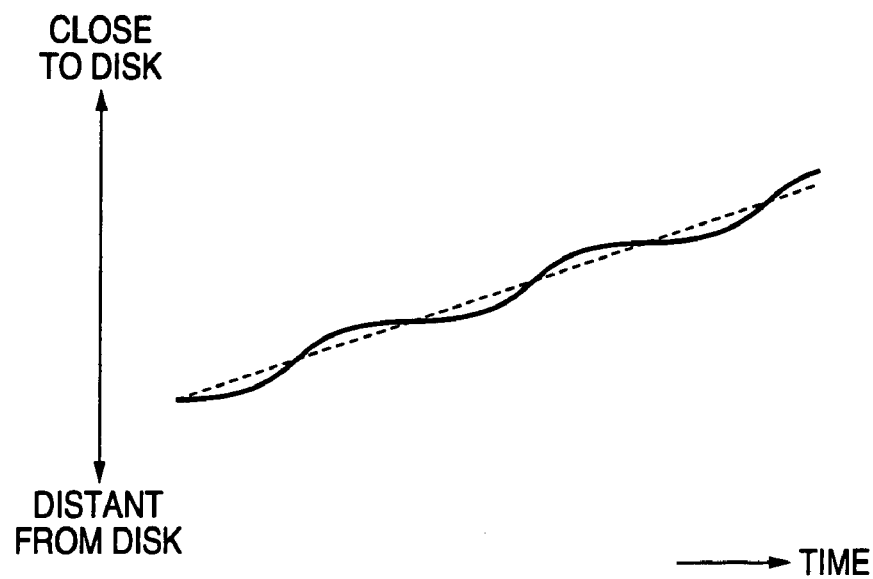
FIG. 9 is a view showing a change in an objective lens position with respect to a recording face of a disk in the case where the objective lens is made to come close to the recording face of the disk by moving the pickup in a state in which the objective lens is completely stopped in the optical axis direction.
Figure 10:
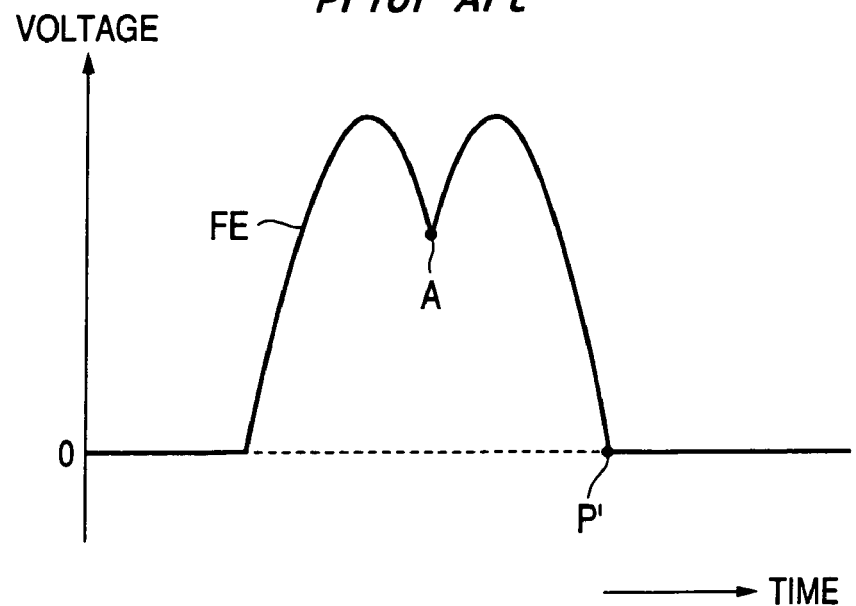
FIG. 10 is a view showing an example of the wave-form of a focusing error signal which causes an erroneous detection of the in-focus-position.

The effect provided by the above embodiment was already confirmed by a demonstration test. The demonstration test was made in such a manner that a position of the objective lens was detected with a laser beam displacement gauge and the result of detection was confirmed with an oscilloscope. The displacement of the objective lens was measured for three cases. The result of measurement in the case where a period of time, in which the pickup is lowered (the pickup is moved away) before the pickup is raised (the pickup is made to come close to the disk), is made to be a period of time corresponding to one period of oscillation generated on the objective lens in the optical axis direction by moving the pickup in the vertical direction is shown in FIG. 4. The result of measurement in the case where a period of time, in which the pickup is lowered before the pickup is raised, is made to be a period of time corresponding to a half of one period of oscillation generated on the objective lens in the optical axis direction by moving the pickup in the vertical direction is shown in FIG. 5. The result of measurement in the case in which the pickup is not lowered before the pickup is raised is shown in FIG. 6. In this test, one period of oscillation generated on the objective lens in the optical axis direction by moving the pickup in the vertical direction was 27.8 [ms].

In FIGS. 4, 5 and 6, W1 is a wave-form showing a position of the objective lens in the vertical direction, and W2 is a wave-form of a drive signal for moving the pickup in the vertical direction. In FIGS. 4, 5 and 6, wave-forms W1 and W2 arranged on the lower side are wave-forms, which are enlarged, showing portion B of wave-forms W1 and W2 arranged on the upper side. In FIGS. 4, 5 and 6, wave-form W1 is shown upside down with respect to the actual position of the objective lens.

According to the above results of measurement, the following were confirmed. According to the time at which the pickup is lowered before the pickup is raised, an intensity of oscillation generated on the objective lens when raising the pickup is different. When a period of time at which the pickup is lowered is made to be a period of time corresponding to one period of oscillation generated on the objective lens in the optical axis direction by moving the pickup, an intensity of oscillation generated on the objective lens when the pickup is raised can be minimized.

In this embodiment, a period of time of moving the pickup in the direction opposite to the direction in which the pickup is originally to be moved corresponds to one period of oscillation generated on the objective lens. However, when this period of time of moving the pickup is a period of time corresponding to an integer multiple of this one period, the substantially same effect can be provided.

In this embodiment, when the pickup is moved in a direction opposite to the direction in which the pickup is originally to be moved in focus search, the objective lens is previously oscillated. However, oscillation may be caused in the objective lens by other methods. For example, the objective lens can be previously oscillated in such a manner that only the objective lens is urged so that the objective lens can be displaced in the optical axis direction, and then the objective lens is released from this urging action.

In this embodiment, the focus search system is employed in which the pickup is moved for searching a focus so that the objective lens approaches the recording face of the disk. However, it is possible to employ the focus search system in which the pickup is moved so that the objective lens is moved away from the recording face of the disk.

In this embodiment, focus search operation is conducted on the disk. However, the present invention can be applied to a case in which focus search operation is conducted on a recording medium other than the disk.

As explained above, according to the present invention, in the case where the in-focus-position of the objective lens is detected by moving the pickup, the objective lens is moved with respect to the recording face of the disk at a substantially constant speed. Therefore, the in-focus-position of the objective lens can be detected more accurately.

What is claimed is:

1. A focus search method for searching a position of an objective lens disposed on a pickup which is a unit for irradiating light onto a disk of a recording medium, a focus of the light irradiated on the disk is adjusted on a recording face of the disk when the objective lens for converging the light to be irradiated on the disk is located at the position by moving the pickup in a direction perpendicular to the recording face of the disk, the focus search method comprising:
moving the pickup in a direction opposite to a pickup moving direction in which the pickup is to be moved to generate oscillation of the objective lens; and
moving the pickup in the pickup moving direction at a timing at which a period of time corresponding to one period of the oscillation generated on the objective lens has passed after moving the pickup in the direction opposite to the pickup moving direction.

2. A focus search method for searching a position of an objective lens disposed on a pickup which is a unit for irradiating light onto a recording medium, a focus of the light irradiated on the recording medium is adjusted on a recording face of the recording medium when the objective lens for converging the light to be irradiated on the recording medium is located at the position by moving the pickup, the focus search method comprising:
generating oscillation on the objective lens by moving the pickup in a direction perpendicular to the recording face of the disk opposite to a pickup moving direction in which the pickup is to be moved; and
moving the pickup at a timing such that the oscillation previously generated on the objective lens is canceled by moving the pickup.

3. A focus search method according to claim 2, wherein the movement of the pickup in the pickup moving direction is started at a timing at which a period of time corresponding to an integer multiple of one period of the oscillation generated on the objective lens has passed after moving the pickup in the direction opposite to the pickup moving direction.

4. A reproducing apparatus comprising:
a pickup having an objective lens;
an actuator for moving the pickup in a direction perpendicular to a recording face of a recording medium; and
a controller,
wherein the controller controls the actuator to move the pickup in a direction opposite to a pickup moving direction in which the pickup is to be moved to generate oscillation of the objective lens, and
the controller controls the actuator to move the pickup in the pickup moving direction at a timing at a period of time corresponding to one period of the oscillation generated on the objective lens has passed after moving the pickup in the direction opposite to the pickup moving direction.

5. A reproducing apparatus comprising:
a pickup having an objective lens;
an actuator for moving the pickup in a direction perpendicular to a recording face of a recording medium; and
a controller,
wherein the controller controls the actuator to generate oscillation on the objective lens by moving the pickup in a direction opposite to a pickup moving direction in which the pickup is to be moved, and
the controller controls the actuator to move the pickup at a timing such that the oscillation previously generated on the objective lens is canceled by moving the pickup.

* * * * *